United States Patent [19]

Pham

[11] Patent Number: 5,585,976
[45] Date of Patent: Dec. 17, 1996

[54] DIGITAL SECTOR SERVO INCORPORATING REPEATABLE RUN OUT TRACKING

[75] Inventor: Ich V. Pham, San Jose, Calif.

[73] Assignee: Seagate Technology, Inc., Scotts Valley, Calif.

[21] Appl. No.: 264,000

[22] Filed: Jun. 22, 1994

[51] Int. Cl.$^6$ .................................................. G11B 5/596
[52] U.S. Cl. ....................................... 360/77.04; 360/78.09
[58] Field of Search ............................. 360/77.04, 78.09, 360/75, 77.08

[56] References Cited

U.S. PATENT DOCUMENTS

| | | | |
|---|---|---|---|
| 4,616,276 | 10/1986 | Workman | 360/77.04 |
| 4,679,103 | 7/1987 | Workman | 360/78.07 |
| 4,697,127 | 9/1987 | Stich et al. | 360/78.06 X |
| 5,204,793 | 4/1993 | Plonczak | 360/77.04 X |
| 5,241,433 | 8/1993 | Anderson et al. | 360/77.04 |
| 5,379,171 | 1/1995 | Morehouse et al. | 360/105 |
| 5,404,253 | 4/1995 | Painter | 360/77.04 |
| 5,444,583 | 8/1995 | Erlich et al. | 360/78.09 |
| 5,465,183 | 11/1995 | Hattori | 360/78.09 |

FOREIGN PATENT DOCUMENTS 3-192584  8/1991  Japan.

OTHER PUBLICATIONS

"Magnetics Technology Centre" Singapore Publication entitled Learning and Compensating for Repeatable Runout of a Disk Drive Servo Using a Recurrent Neural Network by Siri Weerasooriya, Magnetics Technology Center, National University of Singapore ISSN 0218–4877 AC/1/93 1993.

Primary Examiner—Aristotelis Psitos
Assistant Examiner—James L. Habermehl
Attorney, Agent, or Firm—Edward P. Heller, III; Patrick T. King

[57] ABSTRACT

A digital servo control system for controlling a disk file head includes a main control loop at least one head for reading servo information; a voice coil motor (VCM) attached to the head for positioning the head relative to the target track centerline of a track in response to a VCM control signal; means for deriving from the servo information a digital head position error signal (PES); and a processor employing an estimator model for estimating parameters of the VCM and for generating from the estimated parameters and the digital VCM control signal. A secondary control loop receives the PES and provides a compensation signal for repeatable runout (RRO) by providing high open-loop gain near the spindle rotation frequency of said disk. The compensation signal for repeatable runout (RRO) is added to VCM control signal. The secondary control loop includes two states $x_a$ and $x_b$, with state equations $x_a(k)=x_b(k-1)-k_{1r}e(k)$ and $x_b(k)=2\cos\omega T x_a(k)-x_a(k-1)-k_{2r}e(k)$, where $k_{1r}$ and $k_{2r}$ are the feedback coefficients for the states $e(k)$ and $e(k-1)$ respectively and the control signal $u(k)$ is the summation of the VCM control signal and $x_a(k-1)$, which is written as $u(k)=$VCM control signal$+x_a(k-1)$. A compensation module for repeatable runout error includes: a first feedback scaling block having a gain coefficient of $k_{2r}$; second feedback scaling block having a gain coefficient of $k_{1r}$; a first feedback block having a value of $2\cos\omega T$; a second feedback block having a gain of $-1$; a first unit delay for delaying $x_b(k)$; a second unit delay for delaying $x_a(k)$; a first summer having an output $x_b(k)=2\cos\omega T x_a(k)-x_a(k-1)-k_{2r}e(k)$; a second summer having an output $x_a(k)=x_b(k-1)-k_{1r}e(k)$; a third summer for combining the VCM control signal with the output of the second unit delay to provide a modified VCM control signal which includes compensation for repeatable runout.

8 Claims, 7 Drawing Sheets

DIGITAL SECTOR SERVO INCORPORATING REPEATABLE RUN OUT TRACKING

BACKGROUND OF THE INVENTION

1. Field of the Invention

This invention relates to disk drives and, more particularly, to apparatus and methods for improving the seeking and tracking capabilities of a servo system for positioning a read/write head with respect to a track on the disk drive.

2. Prior Art

A disk file is an information storage devices which use one or more rotatable disks, with each disk having a number of concentric data tracks formed thereon for magnetically recording data. Each track includes a number of sectors. In a disk file which has less than four disks, it is necessary to use a digital sector servo control system to maintain a read/write head precisely over a desired track during a read or write operations. This is accomplished by utilizing pre-recorded servo information, which is angularly spaced and interspersed among the data information on each of the disk surfaces of a disk. The operation of moving the head to a desired track is called seeking. The operation of maintaining the head over the centerline of a particular track is called track following. During both seeking and track-following operations, the prerecorded servo information is sensed by the head and demodulated to generate a digital gray code and a position error signal (PES). The digital gray code includes track identification information and the PES indicates the position of the head away from the centerline of a track. The digital gray code and the PES are combined together to generate a measured position signal. The measured position signal is then used in a servo feedback loop to generate a control signal to move the head back to the centerline of the target track. A description of a general digital disk-file servo control system is given by a U.S. Pat. No. 4,679,103 granted to Michael I. Workman and titled "Digital Servo Control System For a Data Recording Disk File".

There are several reasons for the position of a read/write head to be in error, or off track, during a track following operation. One of the major components of head position error is called the repeatable run out (RRO) at the disk rotating frequency which is an error caused by an unbalanced spindle or by a non ideal bearing. The Workman U.S. Pat. No. 4,679,103 does not specifically deal with this problem. The servo control system disclosed in the Workman U.S. Pat. No. 4,679,103 does not have sufficient gain at the run out frequency to fully correct for the RRO error.

Another U.S. Pat. No. 4,616,276 also granted to Michael I. Workman and titled "Digital Servo Control System With Fast Reduction Of Repeatable Head Position Error" deals with this problem. The Workman U.S. Pat. No. 4,616,276 uses a least mean square technique to adjust tap weights for every servo sample based on the measured PES signal. The Workman U.S. Pat. No. 4,616,276 then calculates a feed forward signal using the adjusted tap weights and the values of sine and cosine functions with a frequency which is the same as the disk rotational frequency. The feed forward signal is then added into a control signal to generate a modified control signal which causes the head to follow the track center line. A disadvantage of the Workman U.S. Pat. No. 4,616,276 scheme is that it adds more random noise into the PES signal during track following. Additional quantization noise is generated from additional multiplication operations required in the tap-weight and the feed-forward calculations. The magnitude of the additional quantization noise is approximately 1% to 2% of the track. FIG. 5 of the Workman U.S. Pat. No. 4,616,276 shows that it takes more than one disk revolution to remove the effect of the run out error.

An article entitled "Learning and Compensating for Repeatable Run Out of a Disk Drive Servo using A Recurrent Neutral Network" by S. Weerasooriya, published in 1993 by Magnetic Technology Centre in Singapore, describes a recurrent neural network which can be adaptively trained to generate a correct feed forward signal for removing the effect of the RRO error. This technique also takes more than 1 revolution for adaptation and requires nine tap-weights which generates even more quantization noise than the scheme described in the Workman U.S. Pat. No. 4,616,276. Both the Workman U.S. Pat. No. 4,616,276 and the Weerasooriya article use signal processing techniques to generate a feed forward signal for removing the RRO error. In general, a feed forward approach is more sensitive to variation than is a closed-loop servo solution for correction of RRO error.

A U.S. Pat. NO. 5,241,433 granted to Anderson et al. and titled "Disk Drive Servo Control" discloses a servo control system which includes a reference track in the outer guard bank of a dedicated servo surface and on each of the data surfaces. It combines a supplement PES, which is signal indicating the difference between the servo and the data surface, with a dedicated surface PES to yield a composite PES. The composite PES more accurately follows the track center of a disk surface being addressed. This technique does not remove the RRO error. It only removes the differential RRO which is the difference between the dedicated servo surface and the data surface.

SUMMARY OF THE INVENTION

It is therefore an object of the invention to provide an head control servo system for a disk drive which compensates for repeatable run out (RRO).

In accordance with these and other objects of the invention, apparatus and a method are provided for tracking of the repeatable run out (RRO) error. This is an important requirement for a disk drive servo because it improves the off track performance during track following which determines the read/write performance of a disk drive. Tracking of the RRO error during a seeking operation is also required to maintain off-track arrival time and seek time. The invention provides a technique which is used to compensate for the RRO error in both track following and seeking operations.

During track following, a run out tracking loop, or procedure is added into the servo system to increase the open loop frequency gain at the disk rotational frequency.

During a seeking operation, a feed forward signal from a memory is added to the control signal to allow the servo to track the run out and to provide smooth transition to the track following mode. The feed forward signal from memory is obtained during calibration when the servo is in the track-following mode of operation.

An arrival algorithm is also added to minimize the effect of the natural PES arrival on the run out tracking equations. The disclosed technique completely removes the effect of the RRO error on both seeking and track following and provides a digital servo structure which includes equations (E) and (F) for calculating run out states $x_a$ and $x_b$, where $x_a(k)=x_b(k-1)-k_{1r}e(k)$ and $x_b(k)=2 \cos \omega T \, x_a(k)-x_a(k-1)-k_{2r}e(k)$ and where $k_{1r}$ and $k_{2r}$ are the feedback coefficients for the states $e(k)$ and $e(k-1)$ respectively. The control signal u(k) is the summation of the VCM control signal and $x_a(k-1)$, which is written as u(k)=VCM control signal+ $x_a(k-1)$. The seeking technique which uses a recorded feed forward signal to track the run out during seeking and to provide a smooth transition to the track following loop. The digital sector servo system tracks the RRO error during both seeking and track following.

One embodiment of the invention includes digital servo control system for controlling the position of a disk file head with respect to one of a number of concentric data tracks formed on a disk, where the disk is mounted to a spindle having a spindle rotation frequency. A main control loop includes at least one head for reading servo information from a track having servo information recorded thereon during rotation of the disk; a voice coil motor (VCM) attached to the head for positioning the head relative to the target track centerline in response to a VCM control signal; means for deriving from the servo information a digital head position error signal (PES); and a processor employing an estimator model for estimating parameters of the VCM and for generating from the estimated parameters and the digital VCM control signal.

A secondary control loop, which receives the PES and which provides a compensation signal for repeatable runout (RRO) provides high open-loop gain near the spindle rotation frequency of said disk. The compensation signal for repeatable runout (RRO) is added to VCM control signal. The secondary control loop includes two states $x_a$ and $x_b$ with state equations $x_a(k)=x_b(k-1)-k_{1r}e(k)$ and $x_b(k)=2 \cos \omega T\, x_a(k)-x_a(k-1)-k_{2r}e(k)$, where $k_{1r}$ and $k_{2r}$ are the feedback coefficients for the states e(k) and e(k-1) respectively and where the control signal u(k) is the summation of the VCM control signal and $x_a(k-1)$, which is written as u(k)= VCM control signal+$x_a(k-1)$.

The processor includes means for seeking which uses a calibrated and stored feed forward signal to track repeatable runout during a track-seeking operation to provide a smooth transition to operation of the secondary control loop during tracking wherein $e_{max}=0$, $x_a(k)=u_{ffwd}(i)$, and $x_b(k)=u_{ffwd}(i+1)$, where $e_{max}$ is the maximum value of the PES and $u_{ffwd}(i)$ is the calibrated and stored feed forward signal.

The processor includes a head-arrival procedure for a tracking operation which includes means for dynamically starting a tracking operation by setting $e_{max}$ to zero and then incrementing $e_{max}$ by 0.01 track pitch for each pass through the secondary control loop and wherein the processor includes means for limiting $e_{max}$ to 0.1 track pitch.

Another embodiment of the invention includes a digital servo control system with a main control loop and a compensation module for repeatable runout error which includes: a first feedback scaling block having a gain coefficient of $k_{2r}$; second feedback scaling block having a gain coefficient of $k_{1r}$; a first feedback block having a value of 2 cos $\omega T$; a second feedback block having a gain of -1; a first unit delay for delaying $x_b(k)$; a second unit delay for delaying $x_a(k)$; a first summer having an output $x_b(k)=2 \cos \omega T x_a(k)-x_a(k-1)-k_{2r}e(k)$; a second summer having an output $x_a(k)=x_b(k-1)-k_{1r}e(k)$; a third summer for combining the VCM control signal with the output of the second unit delay to provide a modified VCM control signal which includes compensation for repeatable runout.

The invention provides a method for controlling the position of a disk file head with respect to one of a number of concentric data tracks formed on a disk, where said disk is mounted to a spindle having a spindle rotation frequency, comprising the steps of operating a main control loop and a secondary control loop. Operating the main loop includes the steps of: reading servo information with at least one head from a track having servo information recorded thereon during rotation of the disk; positioning a head relative to the target track centerline in response to a VCM control signal with a voice coil motor (VCM) attached to the head; deriving from the servo information a digital head position error signal (PES); and estimating parameters of the VCM and generating from the estimated parameters and the digital VCM control signal using a processor employing an estimator model. Operating the secondary control loop including the steps of: receiving the PES and providing a compensation signal for repeatable runout (RRO) by providing high open-loop gain near the spindle rotation frequency of said disk; and adding the compensation signal for repeatable runout (RRO) to VCM control signal to provide a composite VCM control signal. The method includes the stop of providing a compensation signal for RRO includes providing two states $x_a$ and $x_b$ with state equations $x_a(k)=x_b(k-1)-k_{1r}e(k)$ and $x_b(k)=2 \cos \omega T\, x_a(k)-x_a(k-1)-k_{2r}e(k)$ where $k_{1r}$ and $k_{2r}$ are the feedback coefficients for the states e(k) and e(k-1) respectively and where the control signal u(k) is the summation of the VCM control signal and $x_a(k-1)$, which is written as u(k)=VCM control signal+$x_a(k-1)$. The method includes seeking a designated track by using a calibrated and stored feed forward signal for tracking repeatable runout during a track-seeking operation to provide a smooth transition to a tracking operation including the steps of setting $e_{max}=0$, $x_a(k)=u_{ffwd}(i)$, and $x_b(k)=u_{ffwd}(i+1)$, where $e_{max}$ is the maximum value of the PES and $u_{ffwd}(i)$ is the calibrated and stored feed forward signal. The method includes providing for head-arrival in a tracking operation by dynamically starting a tracking operation by setting $e_{max}$ to zero and then incrementing $e_{max}$ by 0.01 track pitch for each reading of servo information thereon and limiting $e_{max}$ to 0.1 track pitch.

Another embodiment of the invention includes a method of using a digital servo control system for controlling the position of a disk file head which includes the steps of operating a main control loop and compensating for repeatable runout error with the steps off scaling the PES with a gain coefficient of $k_{2r}$; scaling the PES with a gain coefficient of $k_{1r}$; providing a first feedback block having a value of 2 cos $\omega T$; providing a second feedback block having a gain of -1; delaying $x_b(k)$ by a first unit delay; delaying $x_a(k)$ with a second unit delay; summing to provide $x_b(k)=2 \cos \omega T x_a(k)-x_a(k-1)-k_{2r}e(k)$; summing to provide $x_a(k)= x_b(k-1)-k_{1r}e(k)$; and combining the VCM control signal with the output of the third unit delay to provide a modified VCM control signal which includes compensation for repeatable runout.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
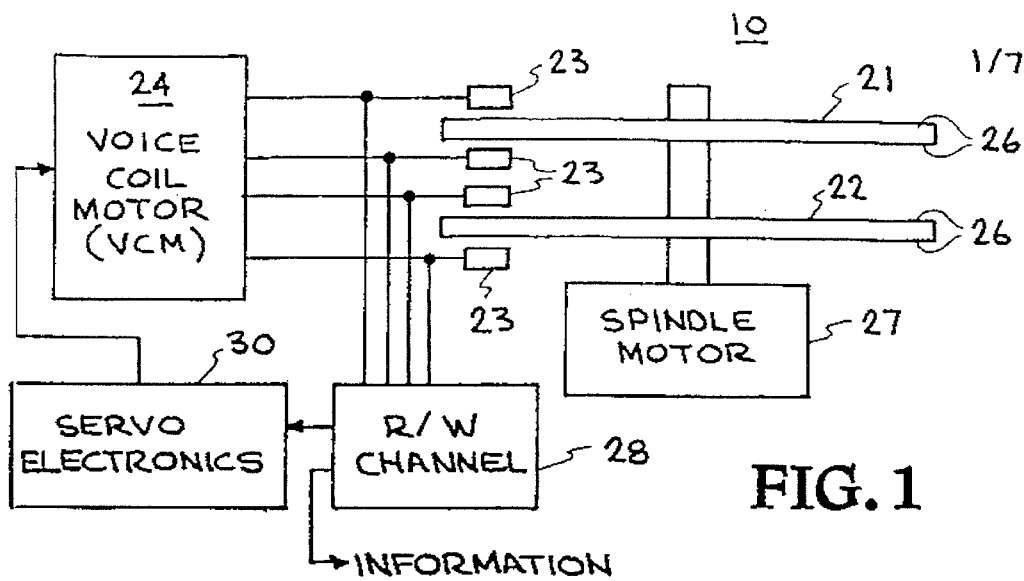
FIG. 1 is a simplified block diagram of a sector servo system for a disk file having two disks.

FIG. 1 show a simplified block diagram of a sector servo system 10 for a disk file having two disks. Hard disk drives, disk surfaces, servo control systems, VCM actuators, and read/write heads are all known in the art. Disk files 20 are information storage devices which utilize one or more rotatable disks 21, 22 with concentric data tracks containing information, one or more heads 23 for reading or writing data onto the various tracks, and an actuator or voice coil motor (VCM) 24 connected by a support arm assembly, known in the art, to the heads 23 for moving one of the heads 23 to a desired track and maintaining that head over the track centerline during read or write operations. Each disk 21, 22 has two data surfaces 26, and the disks 21, 22 are disposed on a spindle driven by a spindle motor 27. The read/write information is electrically coupled to and from the heads 23 by way of a read/write (R/W) channel 28. The R/W channel 28 may include amplifiers, filters and detectors, as required.

The movement of the head 23 to a desired track is referred to as track accessing, or seeking, while the maintaining of the head 23 over the centerline of the desired track during a read or write operation is referred to as track following. The actuator or VCM 24 typically comprises a coil movable through the magnetic field of a permanent magnetic stator. The application of current to the VCM 24 causes the coil, and thus the attached head 23, to move radially. The acceleration of the coil is proportional to the applied current, so that ideally there is no current to the coil if the head 23 is perfectly stationary over a desired track.

In disk files 20 which have a relatively high density of data tracks on the disk 23, it is necessary to employ a servo control system to efficiently move the head 23 between tracks and to maintain the head 23 precisely over the centerline of the desired track during read or write operations. This is accomplished by utilizing prerecorded servo information either on a dedicated servo disk or on sectors angularly spaced and interspersed among the data on the data disks 21, 22. The prerecorded servo information is customarily written to the disks 21, 22 by a servo writer at the factory. The prerecorded servo information is read off the disks 21, 22 and is applied to the input of servo electronics 30 which derive the VCM 24.

Figure 2:
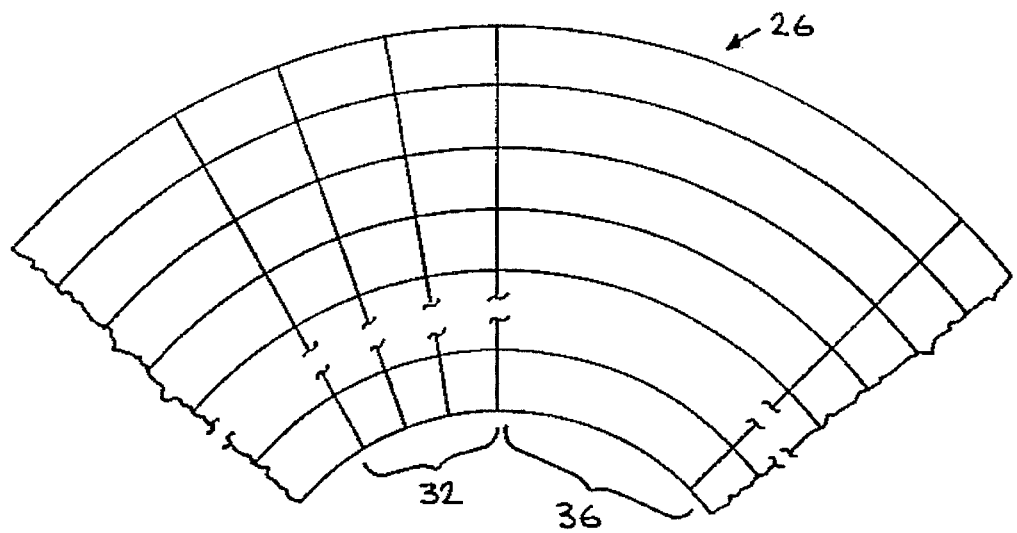
FIG. 2 is a partial view of a portion of the recording surface of a disk having a sector servo pattern recorded thereon.

FIG. 2 shows a partial view of the recording data surface 26 of a portion of a disk 21, 22 that may be used in the present invention. The recording data surface 26 has a sector servo pattern thereon. The present invention relates to a disk drive digital sector servo employing a pattern of servo information prerecorded on sectors interspersed among the data on data disks. The usable recording data surface 26 is divided into a plurality of data storage sectors 30 and a plurality of servo information sectors 32. The servo information sectors 32 are distributed around the disks 21, 22 between adjacent data storage sectors.

Figure 3:
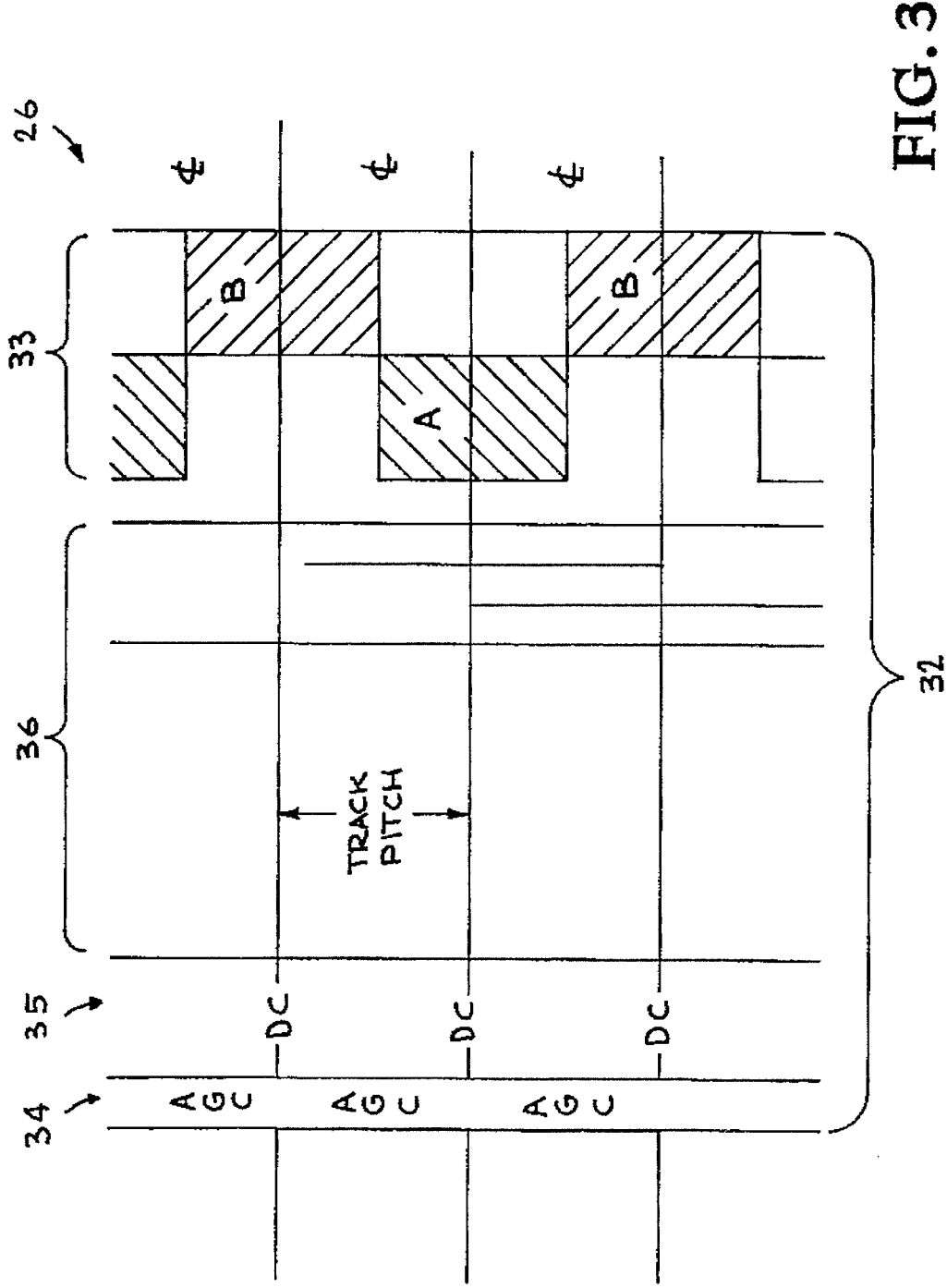
FIG. 3 is a diagram illustrating the servo pattern provided in the servo information sector of a recording data surface.

FIG. 3 shows a schematic diagram illustrating the servo pattern provided in the servo information sector 32 of a recording data surface 26. The servo pattern is composed of four sections: a position error signal (PES) A/B burst portion 33; an automatic gain control (AGC) preamble 34; a servo sync field 35; and a digital Gray code 36. The AGC preamble 34 provides a full amplitude signal coherently written across tracks for providing automatic gain control of the readback signal. The servo sync field 35 provides a unique frequency which enables the digital processing electronics to synchronize to the information in the digital Gray Code 36. The servo sync field 35 may be as simple as a DC erase gap, as indicated in FIG. 3. The digital Gray code 36 includes digital encoding of such information as inner and outer guard band track regions, absolute cylinder number, and index and sector mark. The PES A/B burst portion 33 provides a linear PES voltage which is a measure of the off-track position of the head reading that voltage.

Every servo sample provides information identifying the track, along with an analog component that identifies when the head 23 is to the left or to the right of track center. This analog component is derived from the constant frequency PES A/B burst portion 33. When the constant frequency bursts of servo patterns A and B are read as the disk revolves under the head, the head reads a portion of A and a portion of B. Signals A and B are demodulated and an amplitude comparison is made. The amplitude of A relative to the amplitude of B represents off-track positioning in either a positive or a negative direction. As the head moves across the tracks, the difference between the amplitude of the A burst and the amplitude of the B burst produces a difference signal called the PES. When the PES is zero, the head is on track center.

The Gray code has encoded in it the address of the track. Upon arrival of the head on the track, verification is received that it is on the desired track. Once positioned on the track, the A-B burst information is used for track following. It will be seen that instead of continuous PES information being generated from the disk surface 26, position samples are obtained once every servo information sector 32.

While a specific servo signal format for a disk has been shown, it should be understood that other well known varieties of servo signal format may also be used, if desired.

Figure 4:
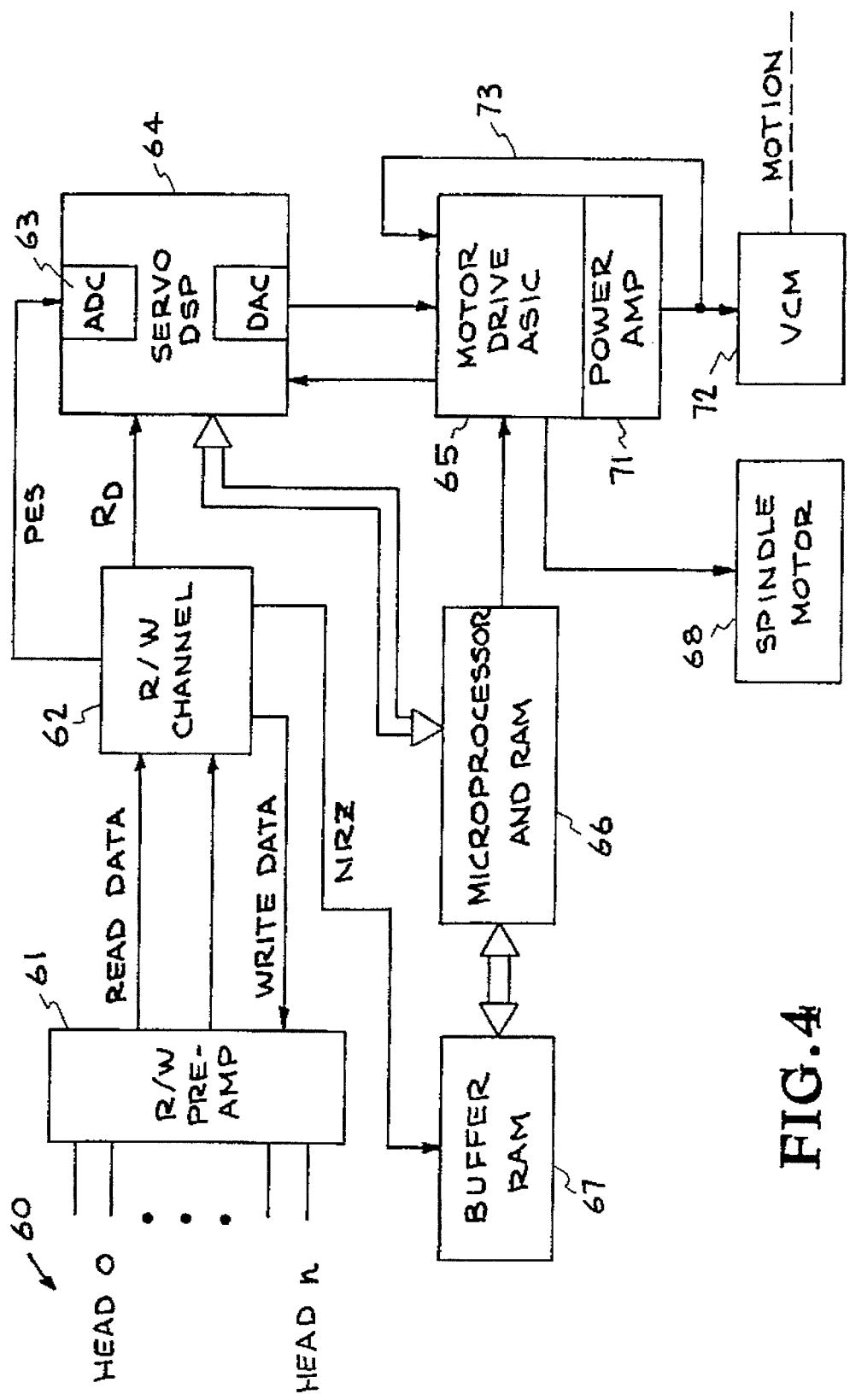
FIG. 4 is a schematic block diagram of a disk drive servo system.

FIG. 4 shows a functional block diagram of a digital sector servo. A plurality of read/write (R/W) heads 60 are coupled by way of a read/write (R/W) preamplifier 61 to a read/write (R/W) channel 62. The R/W preamplifier 61 is a conventional preamplifier, such as, for example, the Model 2020 preamplifier made by SSI. The R/W channel 62 is, for example, an SSI Model 30P3523.

As shown in FIG. 4, the R/W channel 62 also applies digital write data to the R/W preamplifier 61. The analog read data is processed in the R/W channel 62. The processing may involve filtering in a bandpass filter, detecting the amplitude of the A/B bursts, comparison of the amplitude of the A/B bursts, and the like, to provide an analog position error signal (PES) signal. The analog PES signal is then applied to an analog to digital (A/D) converter 63 where the analog PES signal is changed to a digital PES signal, and is applied to a Servo Digital Signal Processor (DSP) 64. The A/D converter 63 and the Servo DSP 64 may be of a type manufactured by Texas Instruments. The A/D converter 63 may be made integral with the Servo DSP 64, if desired.

Digital read data read from the disk by the R/W heads 60 is also coupled from the R/W preamplifier 61 and processed in the R/W channel 62. The digital read data, indicated as RD in FIG. 4, is applied to a different input of the Servo DSP 64. This digital read data includes the Servo Sync Field 35 and the Gray code 36.

The digital control signal from the Servo DSP 64 is converted to an analog signal in an D/A converter 70. The D/A converter 70 may also be made integral with the Servo DSP 64, if desired. The analog control signal is coupled from the D/A converter 70 to a motor drive ASIC 65. The digital control signal is coupled to a microprocessor 66, which includes a RAM. The motor drive ASIC may be a Model PRD1029 ASIC manufactured by Siliconix, and the microprocessor 66 may be the Model 8054 processor manufactured by Intel.

The R/W channel 62 also applies digital Non-Return to Zero (NRZ) data to a buffer RAM 67. The buffer RAM 67 may be a Model M514258B RAM manufactured by OKI, and may include one or more computer interfaces, as needed. The microprocessor 66 is coupled to the buffer RAM 67. The motor drive ASIC 65 drives a spindle motor 68, which may be manufactured by Nidex. The analog servo control signal form the motor drive ASIC 65 is coupled to a power amplifier 71, which may be an integral part of the PRD1029A motor drive ASIC 65 manufactured by Siliconix. The power amplifier 71 drives a VCM 72 which controls the position of the R/W heads 60. In addition, a VCM current "sense" signal is fed back from the power amplifier 71 to the input of the motor drive ASIC 65 on a signal line 73.

In operation, the R/W heads 60 read the PES A/B burst portion 33 of the servo information sector 32 (see FIGS. 2 and 3), and produce an analog signal that goes through the R/W preamplifier 61 and the R/W channel 62. As noted above, the R/W channel 62 may include a filter, a demodulator and an amplitude comparison circuit. The bandpass filter is centered around the center frequency of the A/B burst. The demodulator demodulates the amplitude of the A/B burst, takes the difference between the A burst and the B burst to produce an analog PES signal. The analog PES signal is converted to a digital PES signal in the A/D converter 63, and the digital PES signal is applied to the Servo DSP 64.

The R/W heads 60 also generate a digital read signal. Included in that digital read signal is the Gray code 36, that gives the track address as digital information, and the servo sync field 35. The digital read signal is processed in the R/W preamplifier 61 and the R/W channel 62, and then applied to the digital read input of the Servo DSP 64.

Thus, the readback for the servo information is read and processed in two separate channels. The first channel is the PES channel that converts an analog PES signal to a digital PES signal and applies it to one input of the Servo DSP 64. The second channel is the digital channel that reads the digital servo sync field 35, and reads the digital Gray code 36 and applies the digital readout to the digital read input channel of the servo DSP 64.

Digital data on the data sector 30 (FIG. 2) of the disk surface 26 is read by the R/W heads 60, processed by the R/W preamplifier 61 and the R/W channel 62 and applied as an NRZ signal to the buffer RAM 67. The microprocessor 66 contains the software code that controls the operation of the servo. The motor drive ASIC 65 applies an analog control signal to the power amplifier 71, which in turn drives the VCM 72 to move the R/W heads 60 to a location that brings the PES to zero.

Figure 5:
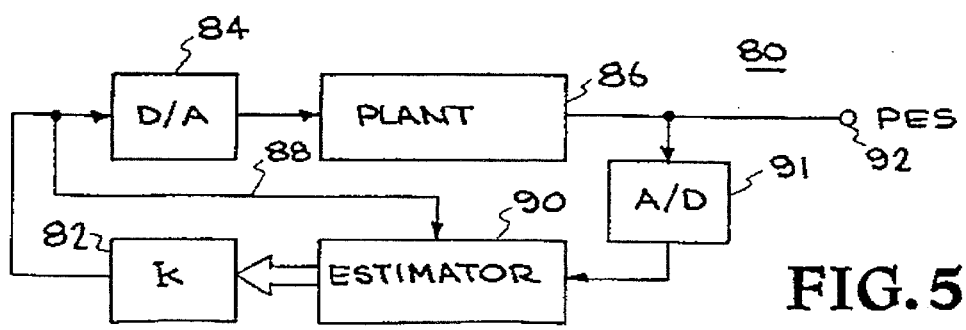
FIG. 5 is a functional block diagram of a prior-art disk drive sector servo system.

FIG. 5 shows a simplified functional block diagram of a conventional disk drive servo system 80. Block 82 represents the controller with a gain K. Block 84 represents a digital-to-analog converter which converts the control signal to an analog control signal that is applied to the input of a head actuator, or plant, block 86. A signal line 88 connects the control signal to an estimator block 90, which includes an estimator model. A head-position error signal (PES) is provided at terminal 92 from the head actuator 86. It is converted to a digital PES using an A/D converter 91 and the digital PES is then provided to an input terminal of the estimator block 90. The output of the estimator block 90 provides estimator equations to the controller 82. In a typical disk drive digital sector servo system, an estimator is used to predict the position, the velocity, and the bias force of an actuator, which is typically a voice coil motor (VCM). This type of prediction is referred to as predicting the actuator dynamic.

Figure 6:
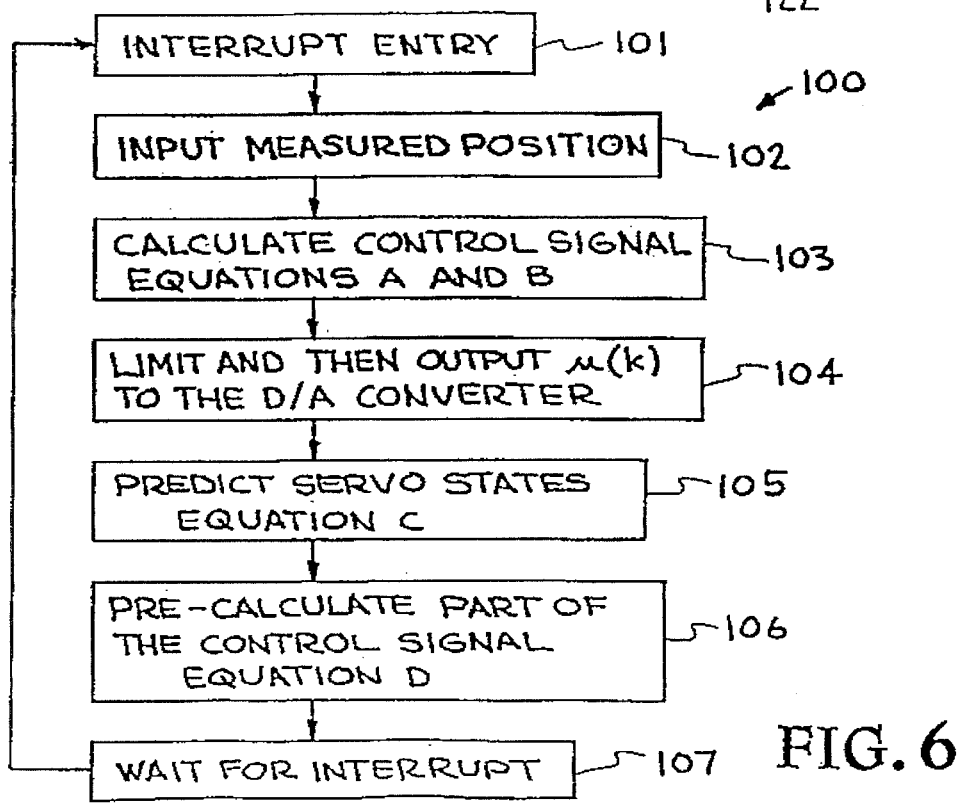
FIG. 6 is a flow chart for the prior art digital servo system of FIG. 5.

FIG. 6 is a flow chart for a prior art digital servo system without RRO compensation. This servo system operates in the microprocessor under interrupt control. The servo sampling time T is defined as the time interval between interrupts. After receiving an interrupt request, the microprocessor reads the PES from the A/D converter and the track number from the Gray code to form the measured position value ($x_{1\ meas}$). It executes equation A to obtain the estimator error which is the difference between the measured and the predicted positions. It then uses $x_{est\_err}(k)$ to calculate the control signal $u(k)$ based on equation B. The value of $u_{pre-cal}$ was calculated in the previous sample to minimize the computation delay, which is the time from the interrupt entry until the control signal is sent to the D/A converter. $k_{gain}$ is used in equation B to adaptively compensate for the overall servo gain variation. The microprocessor then limits $u(k)$ with the maximum available power supply and then sends it to the D/A converter. Equation (C) is then executed to predict position, velocity and bias for the next servo sample. Lastly, the microprocessor calculates part of the control signal $u_{pre-cal}$ based on equation D. It then performs some house keeping tasks and waits for the next servo interrupt.

$$x_{est\_err}(k) = x_{1\ meas} - \tilde{x}_1(k) \quad (A)$$

$$u(k) = k_{gain}(u_{pre\_cal} + k_{pes}x_{est\_err}(k)) \quad (B)$$

$$\tilde{X}(k+1) = \Phi\hat{X}(k) + \Gamma_1 u(k-1) + \Gamma_2 u(k) + L_p x_{est\_err}(k) \quad (C)$$

-continued $$u_{pre\_cal} = \begin{cases} k_2(f(x_{1\ target} - \bar{x}_1(k+1)) - \bar{x}_2(k+1)) - k_3\bar{x}_3(k+1) \text{ for seeking} \\ k_1(x_{1\ target} - \bar{x}_1(k+1)) - \\ k_2\bar{x}_2(k+1) - k_3\bar{x}_3(k+1) \text{ for track following} \end{cases} \quad (D)$$

where:

$X_{est\_err}$=estimator error.

$X_{1\ meas}$=measured position signal.

$k_{pes}$=estimator controller feedback gain.

$k_{gain}$=percentage of gain variation from the nominal.

u=control signal.

$u_{pre\_cal}$=part of the control signal u.

$\hat{X}$=3×1 vector which is estimated position $\hat{X}_1$, velocity $\hat{X}_2$ and $\hat{X}_3$.

$\bar{X}$=3×1 vector which is predicted position $\bar{X}_1$, velocity $\bar{X}_2$ and bias $\bar{X}_3$.

$\Phi$, $\Gamma_1$, $\Gamma_2$=ZOH model which is 3×3, 3×1 and 3×1 respectively.

$L_p$=estimator gain, 3×1 vector.

$k_1$=velocity feedback gain.

$k_2$=velocity feedback gain.

$k_3$=bias feedback gain.

$X_{1\ target}$=target track.

f(.)=velocity trajectory.

Equation (C) predicts the position, the velocity, and the bias based on the mathematical model of the actuator which is represented by matrices. These matrices are functions of the electronic gains and physical parameters including the VCM torque constant and the actuator inertia. They are also function of the sampling time and the calculation delay. They can be calculated using equations given in Chapter 2 of a book titled "Digital Control of Dynamic Systems" 2nd Edition by Franklin, Powell and Workman, published by Addison-Wesley, 1990. Design methodology for selecting the estimator gain $L_p$ and feedback gains $k_1$, $k_2$, $k_3$ and $k_{pes}$, and velocity trajectory f(.) are also discussed in Chapter 12 of the same book.

Block 101 of the flow chart of FIG. 6 indicates an interrupt entry. The microprocessor 66 reads the digital PES that is applied from the A/D converter 63 to the input of the servo DSP 64. The microprocessor 66 also reads the track number from the Gray code that is applied to the RD, or digital read input of the servo DSP 64. The microprocessor 66 uses this information to form the input measured position value ($x_{1\ meas}$) indicated by block 102 in FIG. 6. Block 103 indicates that the next step is to calculate control signal equations (A) and (B) as given above. The microprocessor 66 executes equation (A) to obtain the estimated error, which is the difference between the measured and the predicted positions. The microprocessor 66 then uses the estimator error to calculate the control signal u(k) based on equation (B). A part of the control signal $u_{pre\_cal}$ was calculated in the previous sample to minimize computation delay, where the computation delay is defined as the time from the interrupt entry until the control signal is applied to the D/A converter 70. The overall servo gain $k_{gain}$ is used in equation B to adaptively compensate for the overall servo gain variation.

The microprocessor 66 then limits the control signal u(k) with the maximum available power supply to form a limited control signal which is applied to the D/A converter 70 as indicated in the block 104. As indicated in block 105, the microprocessor 66 then implements equation C to predict position, velocity and bias for the next servo sample. Lastly, in block 106, the microprocessor 66 calculates $u_{pre\_cal}$ using equation D. The microprocessor 66 then performs some housekeeping tasks and waits for the next servo interrupt to occur.

Figure 7:
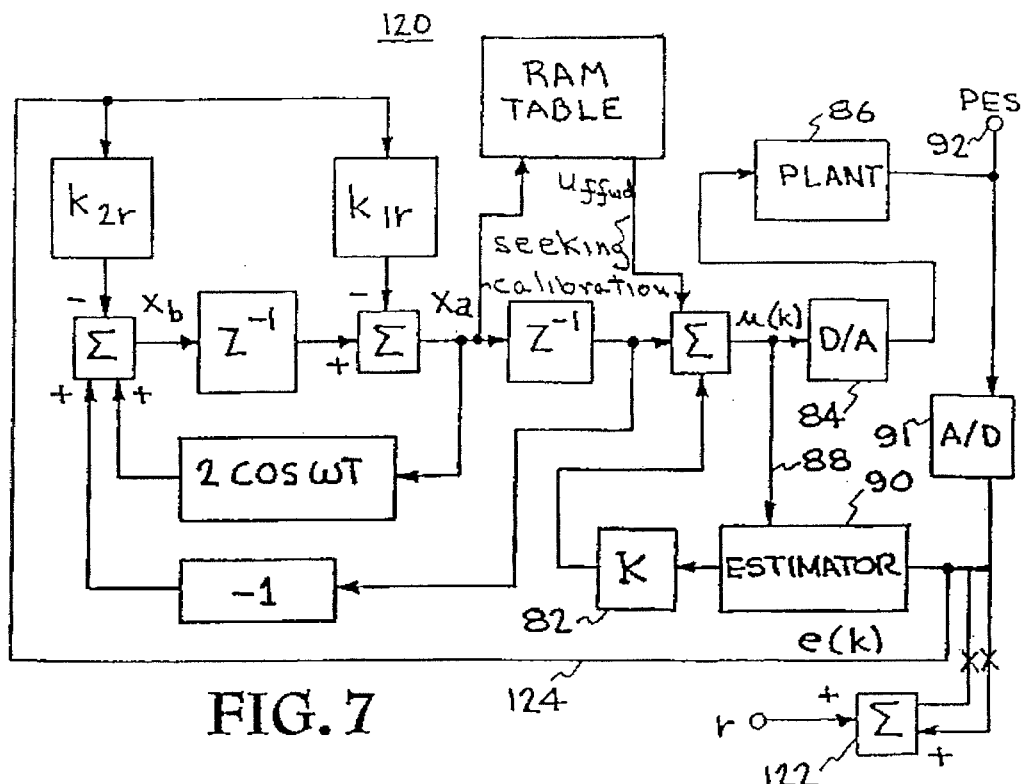
FIG. 7 is a schematic block diagram of a read/write head control servo system according to the invention which includes a compensator system for tracking RRO error.

FIG. 7 illustrates a block diagram for a sector servo system 120, according to the invention. The sector servo system 120 includes the elements of the servo system of FIG. 5, previously described. The system 120 shown in FIG. 7 also provides a track-seeking position error signal to track the repeatable run out (RRO). Block 82 is the controller with a gain K. Block 84 is a digital-to-analog converter which converts the control signal to an analog control signal that is then applied to the input of the head actuator, or plant, block 86. The signal line 88 connects the control signal to the estimator block 90, which includes an estimator model.

The head-position error signal (PES) is provided at terminal 92 from the head actuator 86. It is converted to a digital PES using the A/D converter 91 and then provided to an input terminal of a summation block 122. The other input terminal of the summation block 122 is shown receiving a signal r, which represents unwanted disturbances to the system, occurring, for example, during a seek mode of operation, where the head is traversing a large number of tracks on a disk.

The output signal e(k) of the summation block 122 is fed to an input terminal of the estimator block 90. The output of the estimator block 90 provides estimator equations to the controller 82. The estimator is used to predict the actuator dynamic, that is, the position, the velocity, and the bias force of the voice coil motor (VCM).

The e(k) signal is provided on a path 124 when the system is operating in a track-following mode of operation. The functional blocks, or elements, of the RRO correction loop as shown in FIG. 7 include an internal oscillator with blocking zeros at $\pm j_\omega$, where $_\omega$ is the angular velocity of the spindle and T is the digital servo sampling time. The run out compensator structure includes two more states $x_a$ and $x_b$ with state equations.

$$x_a(k)=x_b(k-1)-k_{1r}e(k) \quad (E)$$

$$x_b(k)=2\cos\omega T\ x_a(k)-x_a(k-1)-k_{2r}e(k) \quad (F)$$

In this structure, $k_{1r}$ and $k_{2r}$ are the feedback coefficients for the states e(k) and e(k−1) respectively. They can be selected by using either a pole placement method or a random search optimization design technique. During track following e(k) is the same as the position error signal PES because r(k) is equal to zero. The control signal u(k) is the summation of the prior art state feedback with the run out state feedback. It can be written as $$u(k)=u_{prior\ art}+x_a(k-1) \quad (G)$$

The run out state feedback $k_{1r}e(k)$ and $k_{2r}e(k-1)$ are indirectly included in equation (C)as $x_a(k-1)$.

Figure 8:
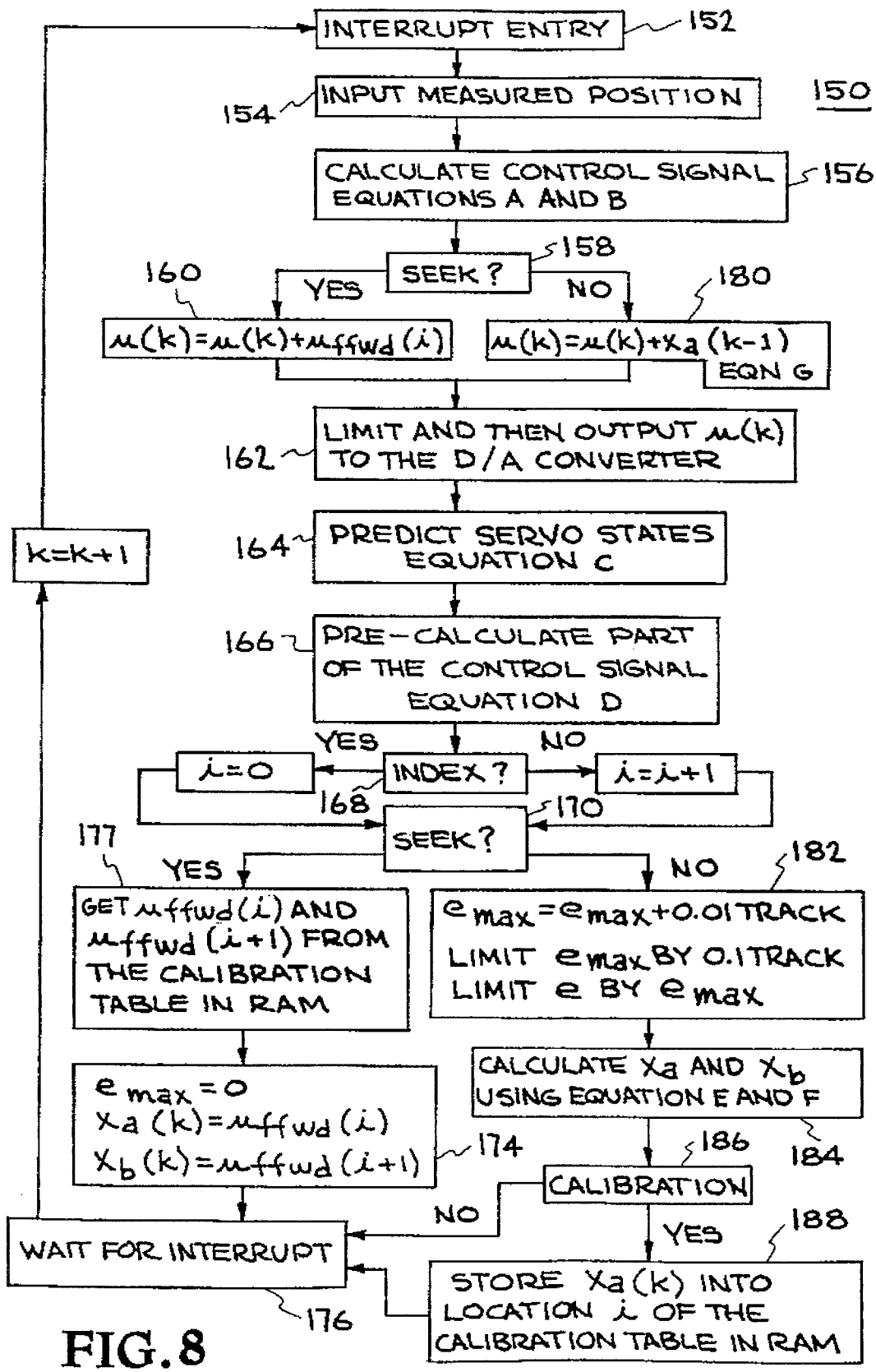
FIG. 8 is a flow chart for a digital servo system according to the invention.

FIG. 8 is a flow chart 150 for a digital servo system according to the invention. This flow chart describes both seeking and track following servo operation.

The seeking operation is discussed first. Block 152 indicates an interrupt entry. The microprocessor 66 reads the digital PES that is applied from the A/D converter 63 to the input of the servo DSP 64. The microprocessor 66 also reads the track number from the Gray code that is applied to the RD, or digital read input of the servo DSP 64. The microprocessor 66 uses this information to form the input measured position value ($x_{1meas}$) indicated by block 154 in FIG. 7. The control signal u(k) is calculated in Block 156 using equations A and B. Block 158 determines that the system is in the seek mode of operation. If so, Block 160 shows that the microprocessor 66 combines u(k) with the calibrated feed forward signal $u_{ffwd}(i)$. Block 162 shows that the modified control signal is limited based on the maximum allowable power supply and then sent to the D/A converter. Block 164 shows the predicted servo states as calculated by equation C. After calculating $u_{pre\_cal}$ as indicated by Block 166, the microprocessor 66 checks in Block 168 for the index to generate the servo sector number i. The system then checks in Block 168 if the system is in the seek mode. If so, Block 170 then obtains $u_{ffwd}(i)$ and $u_{ffwd}(i+1)$ from the calibration table stored in RAM, where $u_{ffwd}(i)$ will then be used as the feed forward signal in the next sample. Lastly, as indicated in Block 172, the system initializes variables $e_{max}$, $x_a$ and $x_b$ to get ready to switch to the track following loop in the next sample, if required. Block 174 indicates that the system then performs background tasks while waiting for the next servo interrupt.

The track following operation is next discussed. Instead of $u_{ffwd}(i)$, the microprocessor modifies the control signal u(k) using the run out state $x_a(k-1)$. After checking for the index and knowing that it is in the track following mode, the microprocessor calculates $e_{max}$ which is set to zero during seeking. It increases $e_{max}$ by 0.01 track every sample until reaching 0.1 track. It limits variable e by $e_{max}$ and then calculates the run out equations E and F. If the servo is in the calibration mode, the microprocessor stores the run out state $x_a(k)$ into location i of the calibration table in RAM. The beginning of the table is when the index occurs and the table size is N which is the number of servo sectors per revolution. This table will be used during seeking to obtain the feed forward $u_{ffwd}(i)$. Similar to the seeking mode, the microprocessor will then perform background tasks while waiting for the next servo interrupt.

Figure 9:
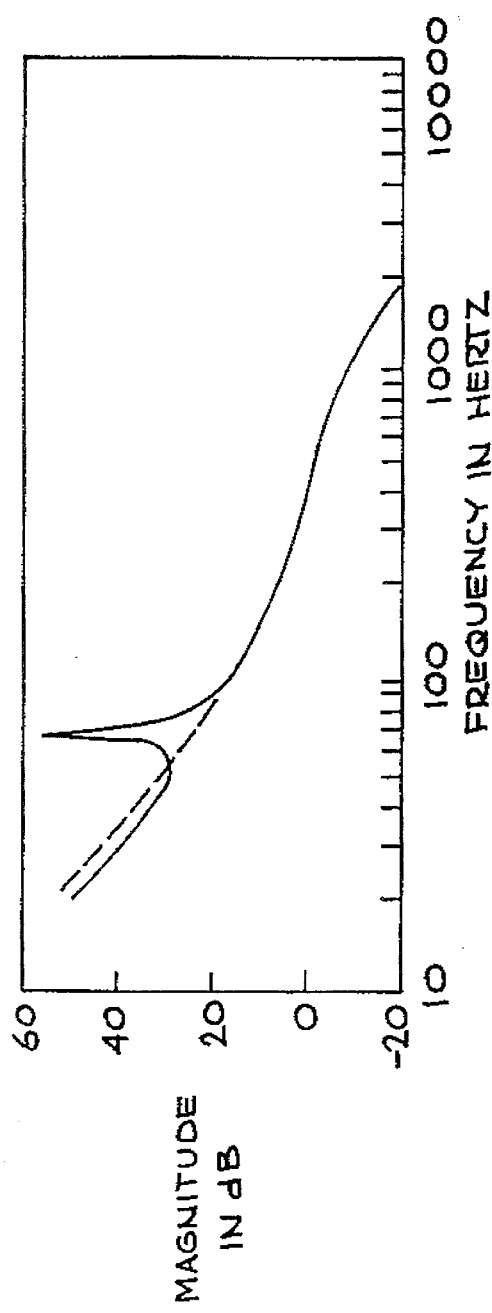
FIG. 9 is a plot of open-loop amplitude response as a function of frequency for the read/write head control servo systems according to the invention.
Figure 10:
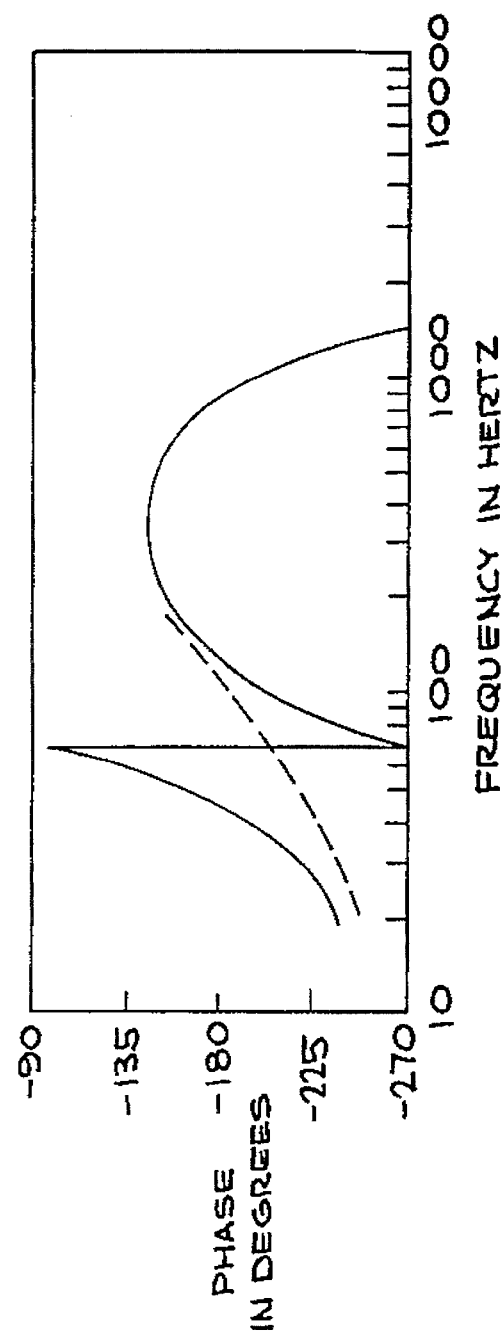
FIG. 10 is a plot of the open-loop phase response as a function of frequency for the servo system according to the invention.

FIGS. 9 and 10 show in solid lines the open loop amplitude and phase responses for the RRO tracking servo according to the invention. The responses for a prior art system without RRO tracking are shown as dotted lines. The open loop gain of the servo system according to the invention at 66 Hz, which is the fundamental spindle speed frequency for a 3960 RPM spindle speed, is about 18 dB higher than the prior art servo. This translates to about an 8-to-1 advantage in run out rejection for a servo system according to the invention. For frequencies above 100 Hz, the open loop frequency response of both servo systems are similar and have the same cross over frequency, phase and gain margins. For frequencies below 50 Hz, the RRO tracking servo according to the invention has about 2 dB less gain than the prior art system. This is acceptable because the 30 dB gain at these frequencies is quite sufficient.

Figure 11:
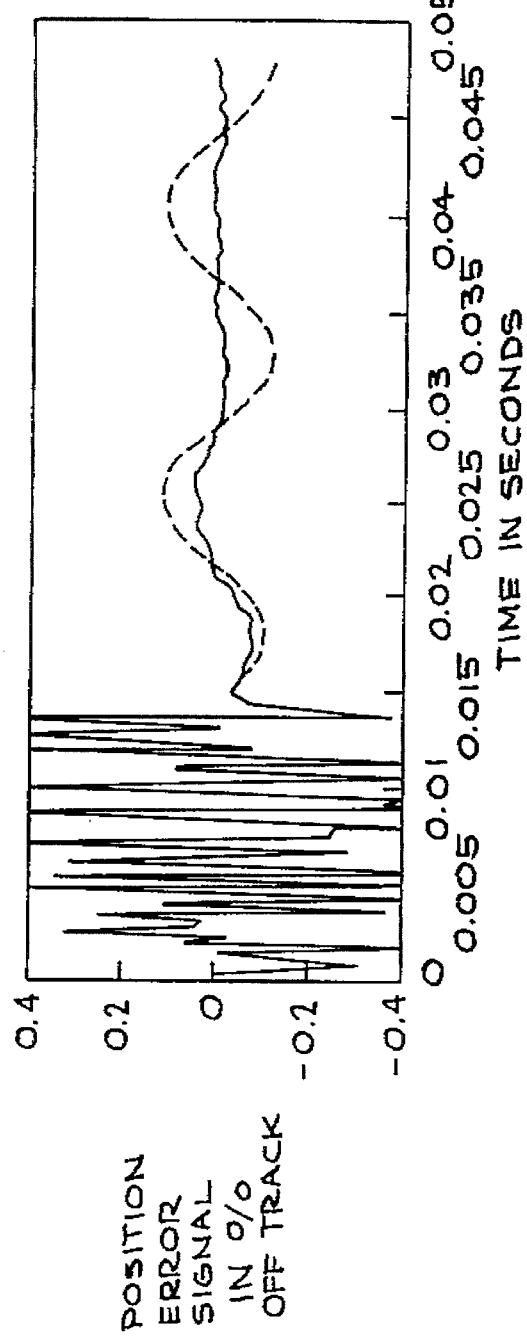
FIG. 11 is a plot of the PES signal for a system according to the invention except the run out compensator during seeking is disabled.

FIG. 11 compares the PES signal from the prior art servo with the RRO compensator which is only active in track following but not in seeking. It shows the PES for a 1000 track seek with 4 track peak-to-peak disk run out. It results in about 12% off track run out for the prior art servo because the gain at 66 Hz is only about 23 dB. This compares to about 1.5% steady state run out for the RRO tracking servo. The additional reduction is directly proportional to the additional 18 dB gain.

The solid line of FIG. 11 shows the PES signal of the servo according to the invention except the run out compensator during seeking is disabled. Upon receiving the seek command, the servo operates in the seek mode until about half track away from the target. It then switches to the track following servo. $x_a$ and $x_b$ are initialized to zero at the switching point since there was no prior knowledge. They are then calculated according to equations E and F. In order to minimize the effect of the natural PES arrival in $x_a$ and $x_b$ calculations, the $e_{max}$ which is maximum allowable for e(k) is dynamically modified during arrival. $e_{max}$ is initialized to zero at the switching point and is then increased by 0.01 track every sample until it is equal to 0.1 track. This technique is implemented and the resulting PES is shown in FIG. 11. It shows that the RRO tracking servo completely nulls out the run out after about 7 milliseconds.

Figure 12:
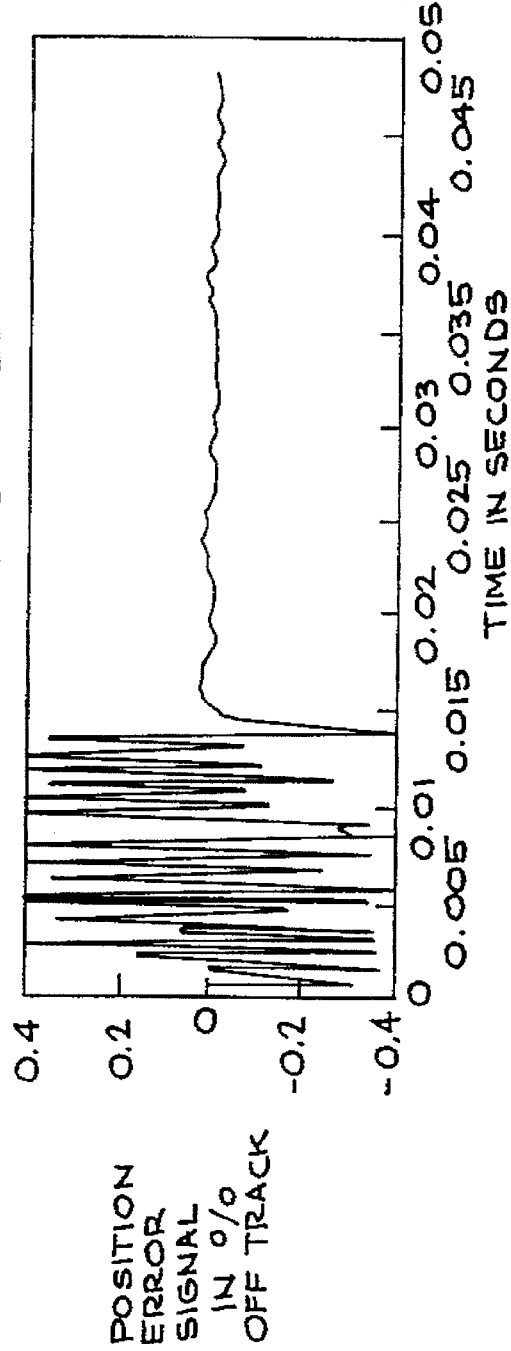
FIG. 12 is a plot of the PES signal for a system according to the invention in both the seeking and track following modes of operation.

The PES arrival can be further improved by including the run out compensator in the seeking algorithm. The best method is to derive the 66 Hz component from the measured position signal. However, it is very difficult because there is more electronic noise during seeking and more error in the measured Gray Code and PES since the head tries to read and moves radially across the servo burst at the same time. In addition, the ideal seeking position also contains low frequency signal which makes it more difficult to extract the 66 Hz component. Alternatively, $x_a$ can be stored away during track following and then used it as a feed forward during seeking. This requires storage size of N which is the number of servo sectors per revolution. These numbers must be referenced to the index to maintain the phase of the run out signal. FIG. 12 shows the PES for a 1000 track seek based on the disclosed servo system including feed forward during seeking, the $e_{max}$ arrival technique, the tracking compensator during track following. It shows that the run out is completely compensated. Both seek time and off track arrival are fully preserved.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A digital serve control system for controlling the position of a disk file head with respect to one of a number of concentric data tracks formed on a disk, where said disk is mounted to a spindle having a spindle rotation frequency, comprising:

a main control loop including:
  at least one head for reading servo information from a track having servo information recorded thereon during rotation of the disk;
  a voice coil motor (VCM) attached to the head for positioning the head relative to the target track centerline of said track in response to a VCM control signal;
  means for deriving from the servo information a digital head position error signal (PES);
  a processor employing an estimator model for estimating parameters of the VCM and for generating from the estimated parameters and the digital PES the VCM control signal for controlling the voice coil motor;
a secondary control loop, which receives the PES and which provides a compensation signal for repeatable runout (RRO) by providing high open-loop gain near the spindle rotation frequency of said disk; and a summer for adding the compensation signal for repeatable runout to the VCM control signal to provide a RRO-compensated VCM control signal u(k) which is compensated for repeatable runout error;

wherein a signal e(k) is a digitized version of the PES and wherein the secondary control loop includes two states $x_a$ and $x_b$ with state equations $$x_a(k)=x_b(k-1)-k_{1r}e(k)$$

$$x_b(k)=2\cos\omega T\, x_a(k)-x_a(a-1)-k_{2r}3(k)$$

where $k_{1r}$ and $k_{2r}$ are the feedback coefficients for the states e(k) and e(k−1) respectively and where the compensated VCM control signal u(k) is the summation of the VCM control signal and $x_a(k-1)$, where the compensated VCM control signal u(k) is written as $$u(k)=\text{VCM control signal}+x_a(k-1).$$

2. The system of claim 1 wherein the processor includes means for seeking which uses a calibrated and stored feed forward signal $u_{ffwd}$ to track repeatable runout during a track-seeking operation to provide a smooth transition to operation of the secondary control loop during tracking wherein $e_{max}=0$, $x_a(k)=u_{ffwd}(i)$, and $x_b(k)=u_{ffwd}(i+1)$, where $e_{max}$ is the maximum value of the PES and $u_{ffwd}(i)$ is the calibrated and stored feed forward signal.

3. The system of claim 2 wherein the processor includes a head-arrival procedure for a tracking operation which includes means for dynamically starting a tracking operation by setting $e_{max}$ to zero and then incrementing $e_{max}$ by 0.01 track pitch for each pass through the secondary control loop and wherein the processor includes means for limiting $e_{max}$ to 0.1 track pitch.

4. A digital servo control system for controlling the position of a disk file head with respect to one of a number of concentric data tracks formed on a disk, where said disk is mounted to a spindle having a spindle rotation frequency, comprising:

a main control loop including:

at least one head for reading servo information from a track having servo information recorded thereon during rotation of the disk;

a voice coil motor (VCM) attached to the head for positioning the head relative to the target track centerline of said track in response to a VCM control signal;

means for deriving from the servo information a digital head position error signal (PES);

a processor employing an estimator model for estimating parameters of the VCM, said processor generating from the estimated parameters and from the PES a digital VCM control signal for controlling the voice coil motor;

a compensation module for repeatable runout error which includes:

an input signal e(k) which is equal to digitized version of the position error signal PES;

a first runout state $x_b(k)$;

a second runout state $x_a(k)$;

a first feedback scaling block receiving the input signal e(k), having a gain coefficient of $k_{2r}$, and having an output $k_{2r}e(k)$;

a second feedback scaling block receiving the input signal e(k), having a gain coefficient of $k_{1r}$, and having an output $k_{1r}e(k)$;

a first feedback block having a gain value of $2\cos\omega T$ and having the second runout state $x_a(k)$ as an input;

a second feedback block having a gain of −1 and having a delayed second runout state $x_a(k-1)$ as an input;

a first unit delay for delaying $x_b(k)$;

a second unit delay for delaying $x_a(k)$;

a first summer having an output $x_b(k)=2\cos\omega T\, x_a(k)-x_a(k-1)-k_{2r}e(k)$;

second summer having an output $x_b(k-1)-k_{1r}e(k)$;

a third summer for combining the VCM control signal from the processor with the output $x_a(k-1)$ of the second unit delay to provide a modified VCM control signal which includes compensation for repeatable runout.

5. A method for controlling the position of a disk file head with respect to one of a number of concentric data tracks formed on a disk, where said disk is mounted to a spindle having a spindle rotation frequency, comprising the steps of:

operating a main control loop including the steps of:

reading servo information with at least one head from a track having servo information recorded thereon during rotation of the disk;

positioning a head relative to the target track centerline of said track in response to a VCM control signal with a voice coil motor (VCM) attached to the head;

deriving from the servo information a digital head position error signal (PES);

using a processor employing an estimator model, estimating parameters of the VCM and generating from the estimated parameters and a digital PES a digital VCM control signal for controlling the voice coil motor;

operating a secondary control loop including the steps of:

receiving the PES and providing a compensation signal for repeatable runout (RRO) by providing high open-loop gain near the spindle rotation frequency of said disk; and adding the compensation signal for repeatable runout (RRO) to the VCM control signal to provide a composite a RRO-compensated VCM control signal;

wherein a signal e(k) is a digitized version of the PES and wherein the step of providing a compensation signal for RRO includes providing two states $x_a$ and $x_b$ with state equations $$x_a(k)=x_b(k-1)-k_{1r}e(k)$$

$$x_b(k)=2\cos\omega T x_a(k)-x_a(k-1)-k_{2r}e(k)$$

where $k_{1r}$ and $k_{2r}$ are the feedback coefficients for the states e(k) and e(k−1) respectively and where the compensated VCM control signal u(k) is the summation of the VCM control signal and $x_a(k-1)$, which is written as $$u(k)=\text{VCM control signal}+x_a(k-1).$$

6. The method of claim 5 including seeking a designated track by using a calibrated and stored feed forward signal $u_{ffwd}$ for tracking repeatable runout during a track-seeking operation to provide a smooth transition to a tracking operation including the steps of setting $e_{max}=0$, $x_a(k)=u_{ffwd}(i)$, and $x_b(k)=u_{ffwd}(i+1)$, where $e_{max}$ is the maximum value of the PES and $u_{ffwd}(i)$ is the calibrated and stored feed forward signal.

7. The method of claim 6 including providing for head-arrival in a tracking operation by dynamically starting a tracking operation by setting $e_{max}$ to zero and then incrementing $e_{max}$ by 0.01 track pitch for each reading of servo information from a track having servo information thereon and limiting $e_{max}$ to 0.1 track pitch.

8. A method using a digital servo control system for controlling the position of a disk file head with respect to one of a number of concentric data tracks formed on a disk, where said disk is mounted to a spindle having a spindle rotation frequency, comprising the steps of:

operating a main control loop including the steps of:

reading servo information with at least one head from a track having servo information recorded thereon during rotation of the disk;

positioning a head relative to the target track centerline of said track in response to a VCM control signal with a voice coil motor (VCM) attached to the head;

deriving from the servo information a digital head position error signal (PES);

using a processor employing an estimator model, estimating parameters of the VCM and, using the processor, generating from the estimated parameters and the PES a digital VCM control signal;

compensating for repeatable runout error in a RRO compensation module, including the steps of:

scaling an RRO compensation module input signal $e(k)$, which is equal to the PES, with a gain coefficient of $k_{2r}$;

providing a first runout state $x_b(k)$ and a second runout state $x_a(k)$;

scaling $e(k)$ with a gain coefficient of $k_{1r}$;

scaling $e(k)$ with a gain coefficient of $k_{2r}$;

providing a first feedback block having a value of $2 \cos \omega T$ with the second runout state $x_a(k)$ as an input;

providing a second feedback block having a gain of $-1$ with a delayed second runout state $x_a(k-1)$ as an input;

delaying $x_b(k)$ by a first unit delay;

delaying $x_a(k)$ with a second unit delay;

summing to provide $x_b(k) = 2 \cos \omega T x_a(k) - x_a(k-1) - k_{2r} e(k)$;

summing to provide $x_a(k) = x_b(k-1) - k_{1r} e(k)$;

combining the VCM control signal from the processor with the output of the third unit delay to provide a modified VCM control signal which includes compensation for repeatable runout.

\* \* \* \* \*